United States Patent [19]
Tomoeda et al.

[11] Patent Number: 6,128,547
[45] Date of Patent: Oct. 3, 2000

[54] MACHINE CONTROL GAGE SYSTEM

[75] Inventors: Masahiro Tomoeda, Mitaka; Sakae Toyoda, Toyohashi, both of Japan

[73] Assignees: Tokyo Seimitsu Co., Ltd., Tokyo; Kondo Machines Works Co., Ltd., Aichi, both of Japan

[21] Appl. No.: 08/980,982

[22] Filed: Oct. 2, 1997

[30] Foreign Application Priority Data

Oct. 7, 1996 [JP] Japan .................................. 8-265977
Nov. 7, 1996 [JP] Japan .................................. 8-295136

[51] Int. Cl.⁷ .............................. G06F 19/00; G06G 7/66
[52] U.S. Cl. .................................... 700/170; 451/5; 451/8
[58] Field of Search ........................... 451/5, 8; 702/168; 33/504; 700/170, 163, 105, 174, 177, 175

[56] References Cited

U.S. PATENT DOCUMENTS

| | | | |
|---|---|---|---|
| 4,490,946 | 1/1985 | Tsujiuchi et al. | 51/165.88 |
| 4,502,125 | 2/1985 | Yoneda et al. | 364/474 |
| 4,570,387 | 2/1986 | Unno et al. | 51/156.71 |
| 4,590,573 | 5/1986 | Hahn | 364/474 |
| 4,711,054 | 12/1987 | Tsujiuchi et al. | 51/165.77 |
| 4,918,627 | 4/1990 | Garcia et al. | 364/552 |
| 5,791,968 | 8/1998 | Matsumura et al. | 451/5 |

*Primary Examiner*—William Grant
*Assistant Examiner*—Victoria Robinson
*Attorney, Agent, or Firm*—Oliff & Berridge, PLC

[57] ABSTRACT

A machine control gage system which is able to immediately recognize the cause of abnormal machining of a workpiece. The machine control gage system determines a change in the outer diameter of the workpiece during grinding, and outputs a control signal to a grinding machine controller when the measurement of the workpiece reaches a predetermined size. The machine control gage system is provided with a memory for containing measurement data obtained during grinding. By entering a predetermined command from a keyboard after machining, the measurement data relating to a specific workpiece can be retrieved from the memory, and the machining process can be repeatedly reproduced on a meter and/or a display means such as a bar-graph display. By fast-forwarding and slow-forwarding, the machining process can be monitored in further detail.

11 Claims, 7 Drawing Sheets

MACHINE CONTROL GAGE SYSTEM

BACKGROUND OF THE INVENTION

1. Field of the Invention

The present invention relates generally to a machine control gage system, and more particularly to a machine control gage system which takes the size of the workpiece during machining process, generates a signal when the size of workpiece corresponds to a predetermined size, and controls a grinding machine by switching to a rough grinding mode, a fine grinding mode and a spark-out grinding mode, retracting a grinding wheel, and the like.

2. Description of Related Art

A machine control gage system is used in a variety of grinding machines such as a cylinder grinding machine to improve machining accuracy and productivity by automation. The machine control gage system takes the size of a workpiece during machining process and controls the grinding machine in real time to manufacture the products of even quality. The grinding process is shown on a display such as a meter and a bar-graph display provided in a control part of the machine control gage system. By monitoring movements on the display, it is possible to determine whether the machining was correctly performed or not.

The conventional machine control gage system, however, has a disadvantage because a user cannot always monitor the display of the machine control gage system during machining. The user takes the sizes of the workpieces having been machined, and eliminates the defective products. When the defective workpiece is found, it is difficult to recognize and eliminate the cause of the defect because the machining has already been completed.

SUMMARY OF THE INVENTION

The present invention has been developed in view of the above-described circumstances, and has as its object the provision of a machine control gage system which is able to quickly find a defective workpiece and easily recognize the cause of the defect.

To achieve the above-mentioned object, a machine control gage system of the present invention comprises: a measuring means for determining a change in the size of a workpiece during grinding, and outputting an electric signal corresponding to the determined change; a control means for monitoring the size of the workpiece according to the electric signal output from the measuring means, and outputting a signal for controlling a machine tool when a measurement of the workpiece reaches a predetermined size; a data storing means for storing measurement data according to the electric signal output from the measuring means during grinding; a data reproducing means for retrieving the measurement data stored in the data storing means according to operation of external operation means, and reproducing the change in the size of the workpiece as machining proceeds; and a display means for displaying a machining process reproduced by the data reproducing means.

According to the present invention, the machine control gage system, which determines the changes in the size of the workpiece during grinding and outputs a signal to control the machine tool when the workpiece reaches a predetermined size, is characterized in that: the measurement data obtained during grinding is stored and reproduced after machining; the machining process is shown on the display means such as a meter and a bar-graph display. Thereby, when the abnormal machining takes place, the machining process is reproduced so as to recognize the cause of the abnormal machining. The measurement data is stored in the data storing means, so that the machining process can be repeatedly reproduced and monitored in detail.

The changes in the size of the workpiece during machining are reproduced at the same speed as the machining speed. The fast forwarding and the slow forwarding enable the machining process to be monitored in further detail.

According to the present invention, the machine control gage system monitors the changes in the size of the workpiece according to the electric signal from the measuring means. The machine control gage system stores, in the data storing means, measurement data of entire or partial machining process of a specific workpiece which is determined as being defective by the false detecting means, and reproduces entire or partial machining process of the specific workpiece. Thus, there is an advantage because the recording capacity of the data storing means can be small, and the measurement data to be reproduced can be easily retrieved.

The machine control gage system is provided with an interface to the exterior which is connected to external equipment such as a personal computer and a printer. The measurement data to be stored can be easily selected, and the measurement data to be reproduced can be easily retrieved. The machining process to be reproduced can be monitored in a variety of ways.

Due to the inferior grinding wheel, the flexure of the workpiece, etc., the workpiece is ground while the grinding wheel is retracted after machine control gaging, and therefore the tolerance becomes minus. After the measurement of the workpiece reaches the target size, the size of the workpiece is further monitored for a predetermined period of time, and the abnormal size can be detected according to whether the workpiece becomes smaller than the minus threshold size or not. If the abnormal size is detected, the abnormality detector shows to the effect, so that the occurrence of the abnormal machining can be quickly recognized.

If the measurement of the workpiece does not reach the target size within a predetermined period of time and a machine control gaging signal is not output, the machining sometimes stops. In this case, the size of the workpiece is taken after the machining stops or after a predetermined period of time, and the measurement is compared with a predetermined plus threshold size so as to detect whether the size is abnormal or not. If the abnormal size is detected, the abnormality display device shows to the effect, so that the occurrence of the abnormal machining can be quickly recognized.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 4(*a*), 4(*b*) and 4(*c*) are views showing the changes in the bar graph when the abnormal machining takes place;

DETAILED DESCRIPTION OF THE PREFERRED EMBODIMENTS

Description will hereunder be given of preferred embodiments of the present invention with reference to the accompanying drawings.

Figure 1:
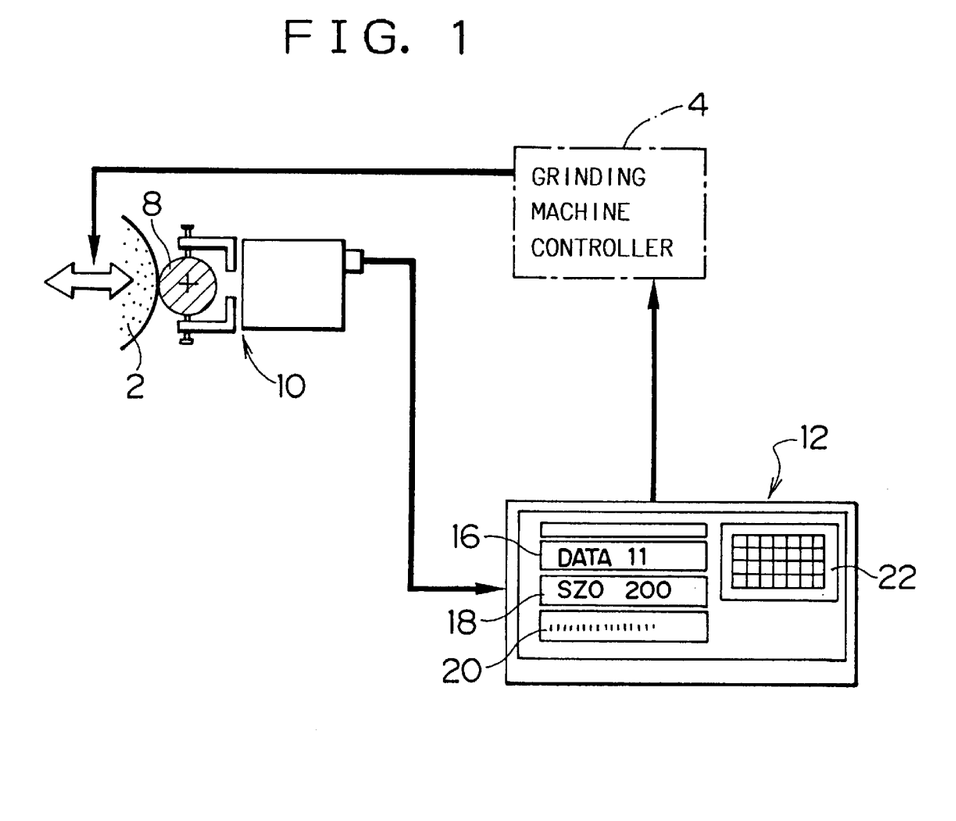
FIG. 1 is a view illustrating the entire construction of a system in the case where the machine control gage system according to the present invention is applied to a cylinder grinding machine.

FIG. 1 illustrates an example of a machine control gage system according to the present invention, which is applied to a cylinder grinding machine.

A grinding wheel 2 of the cylinder grinding machine is rotatably attached to a wheel spindle stock (not shown), and a grinding machine controller 4 controls the speed of rotation of the grinding wheel 2 and the position of the wheel spindle stock. The machine control gage system is comprised mainly of a gage head 10, which determines a change in an outer diameter of a workpiece 8, and a control part 12. The machine control gage system outputs a signal when the measurement of the workpiece 8 corresponds to a predetermined size during machining of the workpiece 8.

The gage head 10 is a two-point contact head, which employs L-shaped leaf springs. A detecting unit of an electric micrometer is provided in the gage head 10. The gage head 10 is attached to a table (not shown) of the grinding machine, and outputs an electric signal which is converted from the amount of mechanical displacement of the contact head resulting from the outer diameter of the workpiece 8.

The control part 12 is a control part of the electric micrometer, and is able to process a variety of data. Character displays 16, 18, and a bar-graph display 20 are provided on the front face of the control part 12. The character displays 16, 18 are composed of LED character displays or fluorescence character displays for example, and the character displays 16, 18 show workpiece numbers, indexes, determination results, measurements, a variety of messages, etc. The bar-graph display 20 is composed of LEDs of two colors so as to read a measurement and a setpoint of a signal at a glance. An indicator such as a meter may be employed instead of the character displays 16, 18 and the bar-graph display 20.

A keyboard 22 is incorporated in the front face of the control part 12. By manipulating the keys of the keyboard 22, a mode can be set, data can be written, display data can be selected, or the like. The control part 12 measures the outer diameter of the workpiece 8 with the gage head 10 during machining process, shows the measurement on the character displays 16, 18 and the bar-graph display 20 at the same time, and generates the signal when the outer diameter of the workpiece 8 reaches the predetermined value.

The grinding machine controller 4 changes machining speed according to the signals from the control part 12, from high-speed machining to low-speed machining, specifically, from rough grinding to fine grinding to spark-out grinding for example. The grinding machine controller 4 controls the machining according to the signals from the control part 12, such as stopping the machining, retracting the wheel spindle stock.

Figure 2:
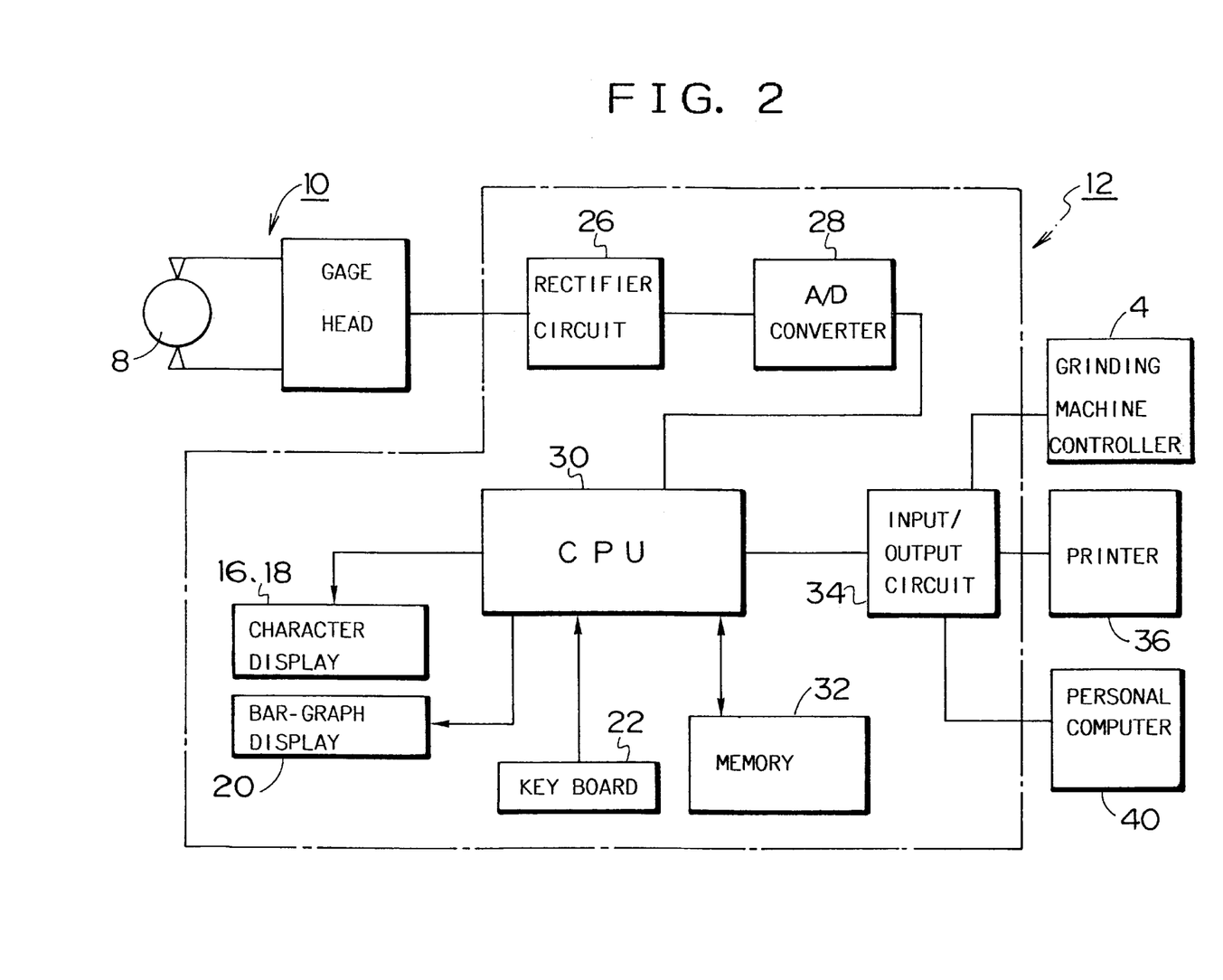
FIG. 2 is a block diagram illustrating the construction of the machine control gage system.

FIG. 2 is a block diagram illustrating the construction of the machine control gage system.

During machining, electric signals representing the measurement of the workpiece 8 are output from the gage head 10, and the output signals are rectified by a rectifying circuit 26. Then, the rectified signals are converted into digital signals by an A/D converter 28, and the converted signals are input to a central processing unit (CPU) 30. The CPU 30 displays the measurement on the character displays 16, 18 and the bar-graph display 20 according to the input measurement data. The CPU 30 also stores the measurement data in a memory 32 at regular intervals (e.g. from 10 msec to 50 msec). The measurement data representing machining processes of multiple workpieces can be stored in the memory 32 until the memory 32 is full.

When the measurement of the workpiece 8 reaches a predetermined size during the machining process, the CPU 30 outputs the signal. The output signal is input to the grinding machine controller 4 via an input/output circuit (an interface to the exterior) 34.

After machining, by entering an instruction (a command) to reproduce the measurement data, which is stored in the memory 32, of a specific workpiece among the multiple workpieces from the keyboard 22, the CPU 30 retrieves the measurement data of the designated workpiece from the memory 32. Then, the workpiece number (data number) is shown on the character display 16, and the machining process of the workpiece is reproduced on the character display 18 and the bar-graph display 20. The retrieved data can be input to a printer 36, which is connected to the CPU 30 via the input/output circuit 34, so as to print a graph, etc. showing the machining process.

The control part 12 may be connected to external equipment such as a personal computer 40 via the input/output circuit 34, so that data can be exchanged between the control part 12 and the personal computer 40. The measurement data to be retrieved can be selected by means of an input device of the personal computer 40. The machining process can be reproduced on a display of the personal computer 40.

Description will hereunder be given of the operation of the machine control gage system which is constructed in the above-mentioned manner.

Figure 3:
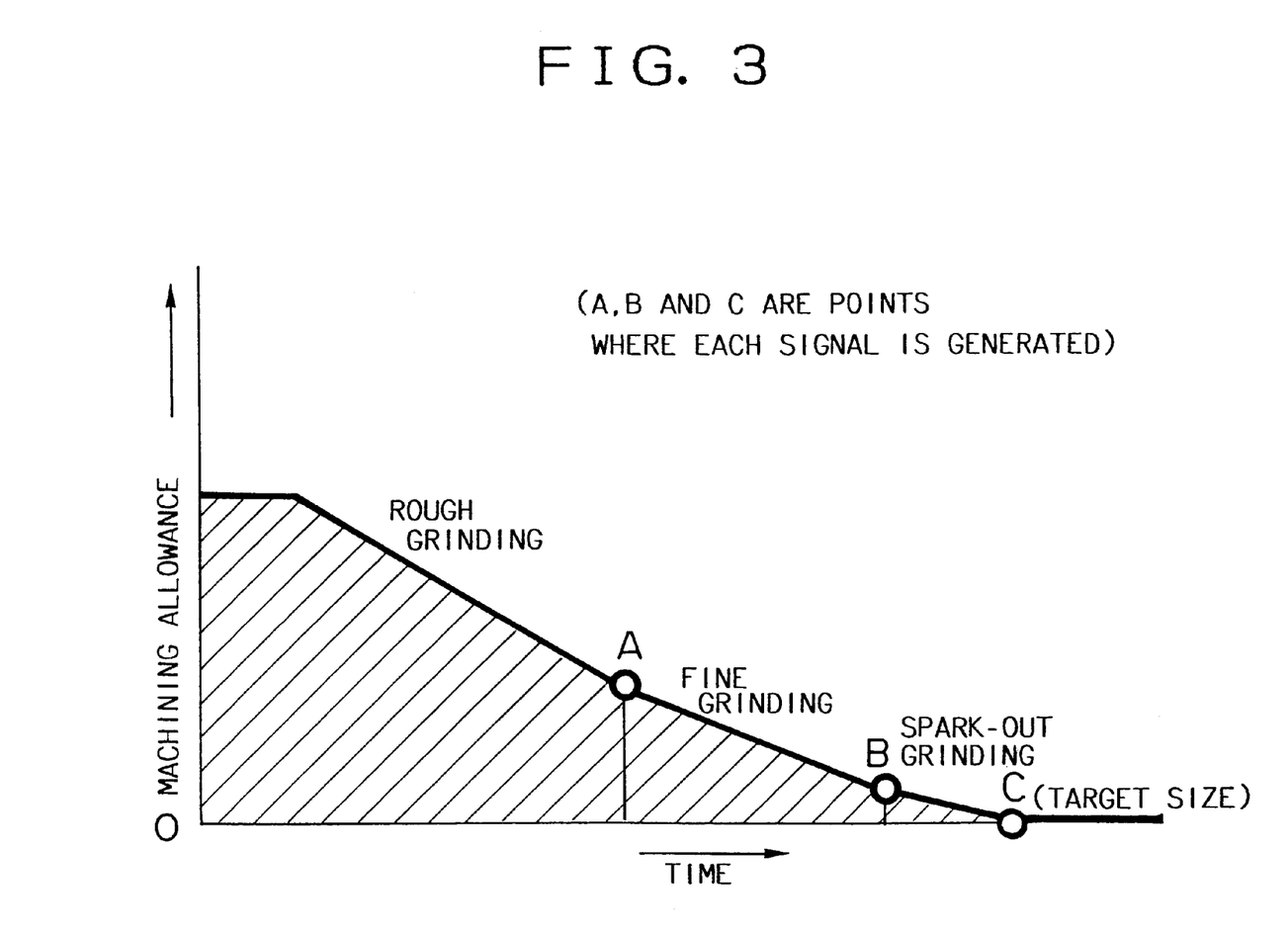
FIG. 3 is a graph showing an example of the machining allowance in connection with the machining time in the normal machining.

FIG. 3 is a graph showing an example of the machining allowance in connection with the machining time in the normal machining. When the size of the workpiece 8 taken with the gage head 10 reaches the first predetermined size (A in FIG. 3), the control part 12 outputs the first signal. The rough grinding is switched to the fine grinding according to the first signal. When the measurement of the workpiece 8 reaches the second predetermined size (B in FIG. 3), the control part 12 outputs the second signal. The fine grinding is switched to the spark-out grinding according to the second signal. When the measurement of the workpiece 8 reaches the target size (C in FIG. 3), the control part 12 outputs the third signal. The wheel spindle stock is retracted according to the third signal. Although the measurement may fluctuate in the process of rough grinding, the machining allowance gradually decreases as the normal machining proceeds in the process of fine grinding and finish grinding.

However, defective workpieces can be produced under some circumstances, and they are sometimes found in examination after machining. The defective workpieces are produced for the following reasons: dust adheres to a workpiece holding member to displace the axis of the workpiece, the axis of the workpiece is displaced due to a shortage of a workpiece holding force, the grinding wheel is inferior, and abrasive grains and/or chips, etc. adhere to a contact part of the gage head.

If the defective workpiece is found, a predetermined command and the workpiece number are entered to the machine control gage system from the keyboard 22, and the machine control gage system retrieves the measurement data representing the machining process of the defective workpiece. If, for example, the measurement data of the last workpiece are retrieved, "DATA –1" is displayed on the character display 16, and the machining process of the workpiece is reproduced on the character display 18 and the bar-graph display 20. The speed of reproduction is the same as the speed of machining if nothing is instructed.

Figure 4A:
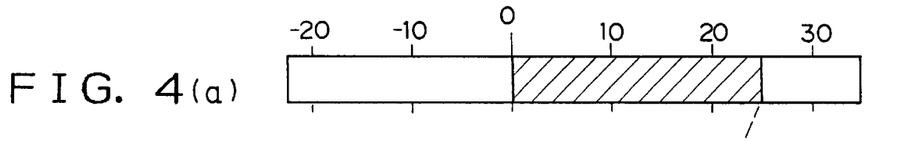
Figure 4B:
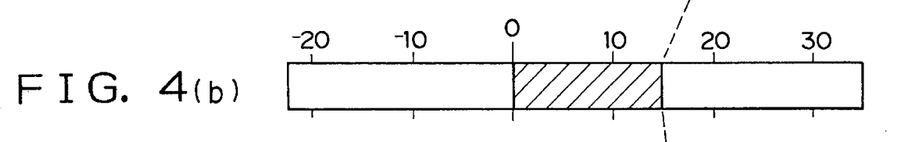
Figure 4C:
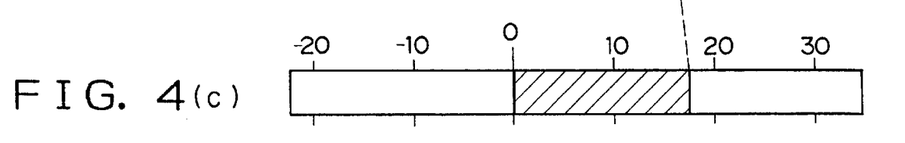

FIGS. 4(a), 4(b) and 4(c) show an example of the changes in the bar graph in the case when the abnormal machining takes place. On the bar-graph display 20 with the target size being zero, the machining allowance is displayed as plus values. The bar graph changes from FIG. 4(a) to 4(b) to 4(c) as the machining proceeds. In the normal machining, the machining allowance gradually decreases as shown in FIG. 3, and the measurement never increases. In the abnormal machining, however, the measurement increases or is unchanged.

Figure 5:
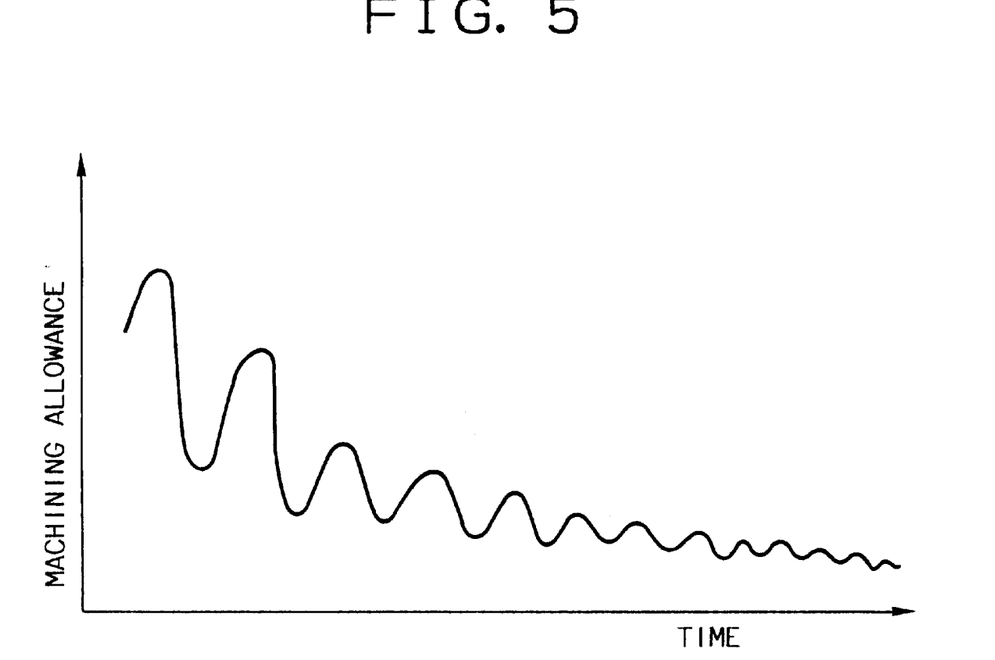
FIG. 5 is a graph showing an example of a relation between the machining time and the machining allowance when the abnormal machining takes place due to the displacement of the axis.
Figure 6:
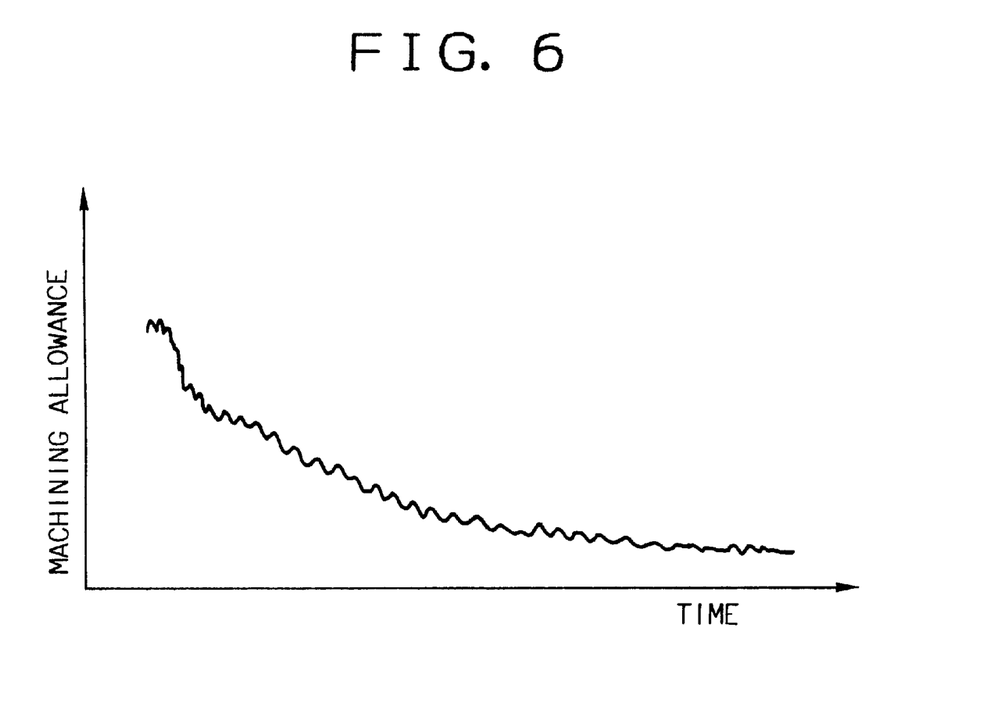
FIG. 6 a graph showing an example of a relation between the machining time and the machining allowance when the abnormal machining takes place due to the defective grinding wheels.
Figure 7:
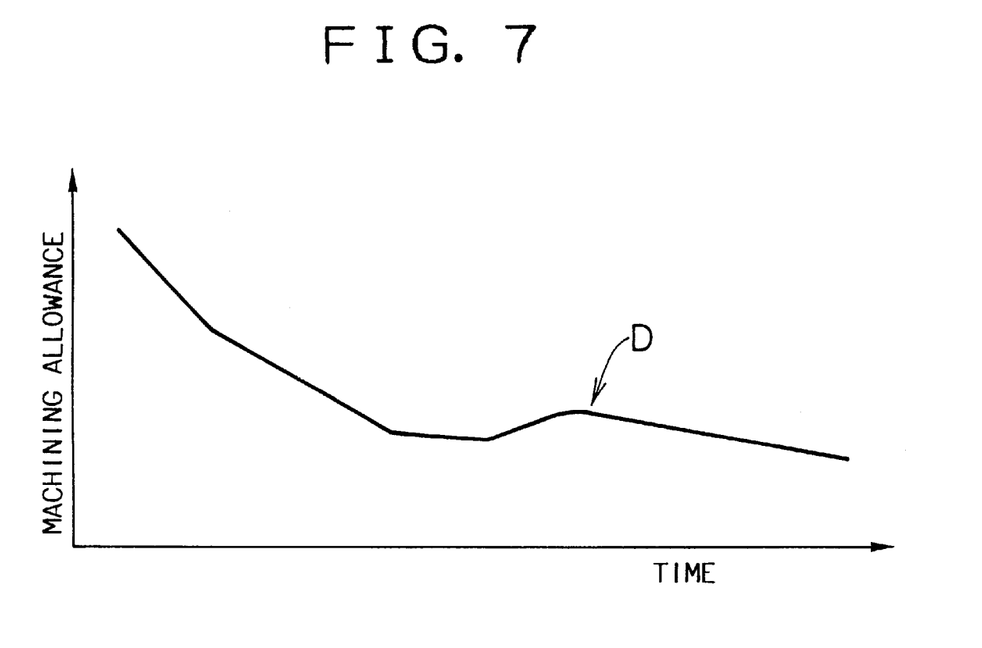
FIG. 7 is a graph showing an example of a relation between the machining time and the machining allowance when the abnormal machining takes lace due to the adhesion of the abrasive grains.
Figure 8:
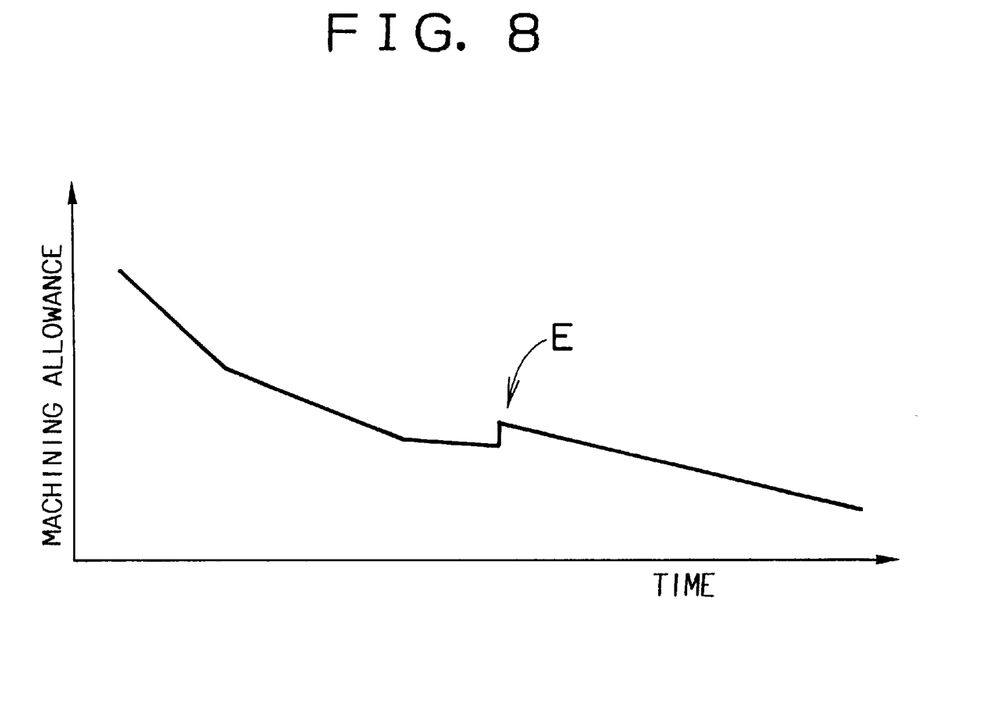
FIG. 8 is a graph showing an example of a relation between the machining time and the machining allowance when the abnormal machining takes place due to the adhesion of the chips.

FIG. 5 shows an example of the machining allowance in connection with the machining time in the case where the axis of the workpiece is displaced, and FIG. 6 shows an example of the machining allowance in connection with the machining time in the case where the grinding wheel is inferior.

As shown in FIG. 5, if the abnormal machining takes place due to the displacement of the axis, the measurement heavily fluctuates and gradually decreases. On the other hand, in the case of the abnormal machining caused by the inferior grinding wheel, the measurement lightly fluctuates and gradually decreases as shown in FIG. 6. If the abrasive grains gradually adhere to the contact part of the gage head 10, the measurement gradually increases as indicated with D in FIG. 7. If the chip, etc. adheres to the contact part of the gage head 10, the measurement suddenly increases as indicated with E in FIG. 8. As shown in FIGS. 5–8, the measurement temporarily increases if the abnormal machining takes place.

The machining process can be repeatedly reproduced by retrieving the measurement data stored in the memory 32. By monitoring the changes in the bar-graph display 20, it is possible to recognize the cause of the abnormal machining. It is especially effective in the process of fine grinding and finish grinding because the measurement irregularly changes in the process of rough grinding as stated previously.

Entering commands to fast-forward and slow-motion reproduce from the keyboard 22 can change the speed of reproduction, and thus only the necessary part of the machining process can be monitored in further detail.

Furthermore, the graphs as shown in FIGS. 5–8 may be printed on the printer 36, and they may be also shown on the display of the personal computer 40, so that the cause of the abnormal machining can be more correctly recognized.

If the cause of the abnormal machining is recognized, it is possible to eliminate the cause by examining the workpiece holding member, dressing or renewing the grinding wheel, or the like.

In this embodiment, the outer diameter of the workpiece is measured, but the present invention is not restricted to this. The inner diameter, the thickness, the width, etc. of the workpiece can be measured.

Moreover, in this embodiment, the measurement data relating to all the workpieces are stored whether each machining is normal or abnormal. The present invention, however, should not be restricted to this. For example, if the measurement of the workpiece only decreases during fine grinding, it is determined that the machining was correctly performed, and the measurement data is erased from the memory 32. If the measurement temporarily increases during fine grinding, it is determined that abnormal machining took place, and the measurement data of the defective workpiece is stored.

Since only the abnormal part of the measurement data is stored and entire or partial machining process of the workpiece which is considered as being defective is reproduced, the recording capacity of the memory 32 can be small, and the measurement data representing the machining process to be reproduced can be easily retrieved.

After the measurement of the workpiece 8 reaches the target size, the workpiece 8 may be ground while the grinding wheel 2 is retracting, due to the inferior grinding wheel, the flexure of the wheel spindle, the uneven movement of the grinding wheel 2, the flexure of the workpiece 8, etc. Thereby, a defective workpiece which is smaller than the target size by more than tolerance may be produced. For this reason, the size of the workpiece 8 should be monitored for a predetermined period of time after the measurement of the workpiece 8 reached the target size.

Figure 9:
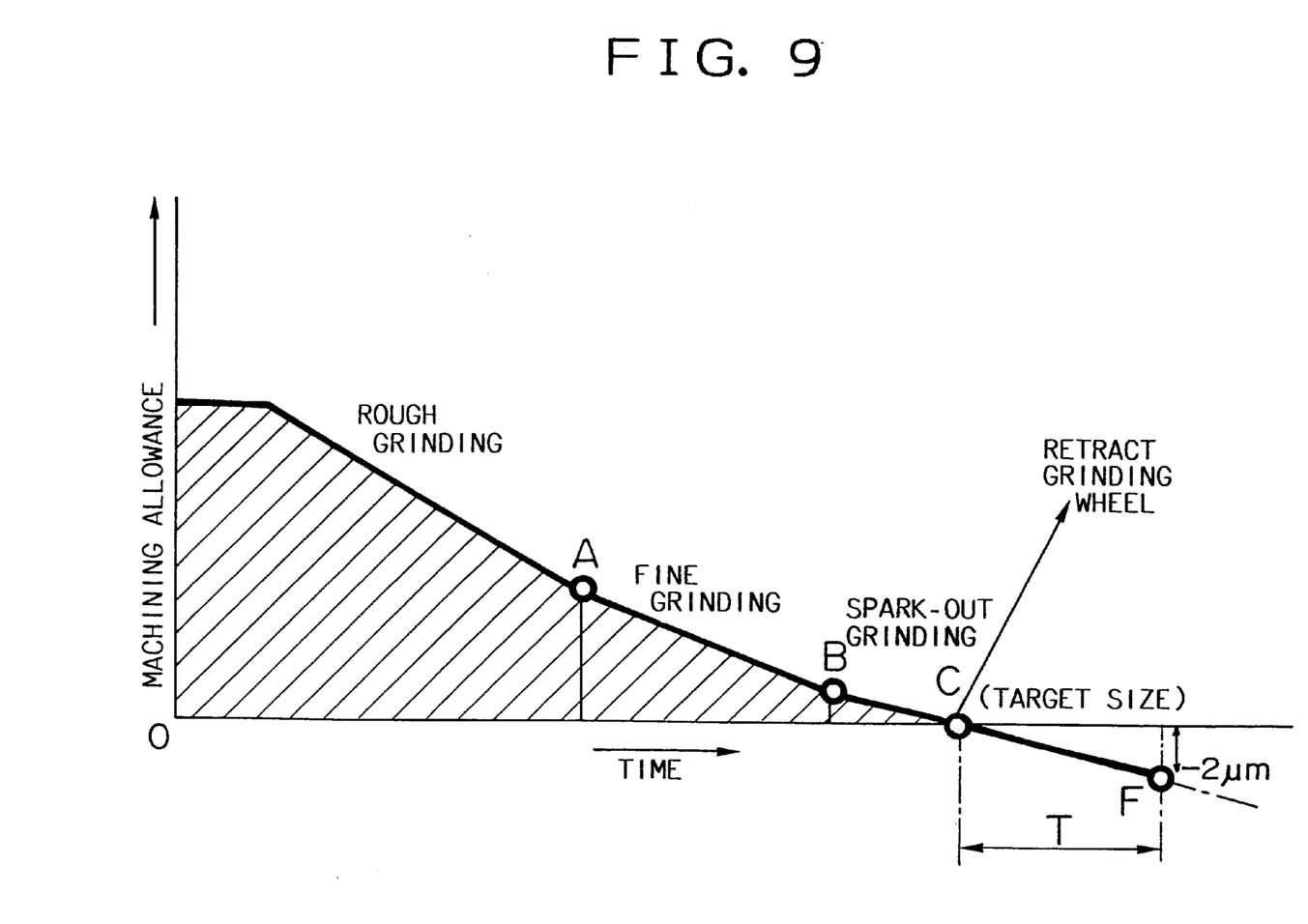
FIG. 9 is a view showing a means for detecting the abnormal machining.

As shown in FIG. 9, preset is a period of time (T) for monitoring the size of the workpiece after the measurement of the workpiece reaches the target size indicating an end of the grinding. A minus threshold size of the workpiece, which is smaller than the target size by 2 $\mu$m for example, is predetermined (F in FIG. 9). If the measurement of the workpiece reaches the minus threshold size within the preset period of time, a signal indicating the abnormal size (hereinafter referred to as a minus signal) is generated.

If the minus signal is not output, the machining is determined as being normal. If the minus signal is output, the machining is determined as being abnormal.

The control part 12 is provided with a display means (not shown) such as a display lamp and a liquid crystal display panel for displaying whether the machining is normal or abnormal. If the minus signal is not output, the display means shows that the normal machining was performed. If the minus signal is output, the display means shows that the abnormal machining was performed.

According to the above-stated construction, after the measurement of the workpiece reaches the target size, that is, after the signal for instructing to retract the grinding wheel is output, the gage head 10 continues monitoring the size of the workpiece for the predetermined period of time (T), and the gage head 10 is retracted after the predetermined period of time (T).

During this process, if the measurement of the workpiece reaches the minus threshold size (the target size –2 $\mu$m), the minus signal is output, and the display means shows that the abnormal machining was performed. On the other hand, if the measurement of the workpiece is more than the minus threshold size, the minus signal is not output, and the display means shows that the normal machining was performed. Thus, whether the machining is normal or abnormal can be quickly determined. If the minus signal is output, it is determined that abnormal machining took place, and the measurement data of the defective workpiece is stored.

In FIG. 9, after the measurement of the workpiece reaches the target size, the measurement and the minus threshold size of the workpiece are compared to detect the abnormal size. The present invention, however, should not be restricted to this. A plus threshold size of the workpiece, which is larger than the target size by 2 μm for example, is predetermined, and if the machining stops before the measurement of the workpiece reaches the target size, the measurement may be compared with the plus threshold size so as to detect the abnormal size.

For example, if the measurement of the workpiece does not reach the target size and the signal indicating that the size has reached the target size is not output in a predetermined period of time after the spark-out grinding starts (B in FIG. 9), the machining stops, and the wheel spindle stock is retracted. Even after the machining stops, however, the gage head 10 continues taking the size of the workpiece 8. If the measurement is equal to or larger than the plus threshold size, a signal indicating the abnormal size (abnormality detection signal) is output.

If the abnormality detection signal is not output, it is determined that the size of the workpiece is within the allowable size (the plus tolerance), and the machining is determined as being normal. On the other hand, if the abnormality detection signal is output, the machining is determined as being abnormal, which is shown on the display.

According to the above-described construction, whether the machining is normal or abnormal can be quickly determined. When the abnormal size is detected, the measurement data of the defective workpiece may be stored.

It is more effective if the abnormality detection based on the comparison between the measurement of the workpiece and the plus threshold size is combined with the abnormality detection based on the comparison between the measurement of the workpiece and the minus threshold size, which is described with reference to FIG. 9.

In the above embodiments, the present invention is applied to the cylinder grinding machine which employs the grinding wheel, but the present invention may also be applied to other machine tools which use a bite to quickly find the abnormal machining resulting from the broken bite.

As set forth hereinabove, according to the machine control gage system of the present invention, the measurement data obtained during machining is retrieved after machining, and the machining process is shown on the display means such as the meter and the bar-graph display. Thus, when the defective workpiece is produced, the machining process of the workpiece can be repeatedly reproduced in order to easily recognize the cause of the abnormal machining. Thereby, the cause of the abnormal machining can be quickly eliminated, which is effective for maintenance of the machine tool such as the grinding machine.

After machine control gaging, the size of the workpiece is further monitored for a predetermined period of time to confirm whether the workpiece becomes smaller than the predetermined threshold size, thereby determining whether the machining is normal or abnormal. If the abnormal size is detected, the abnormality display device shows to the effect, so that the occurrence of the abnormal machining can be quickly recognized.

After the machining stops before the workpiece reaches the predetermined size, the size of the workpiece is taken, and whether the measurement is more than the preset plus threshold size is confirmed so as to determine whether the machining is normal or abnormal. If the abnormal size is detected, the abnormality display device shows to the effect, so that the occurrence of the abnormal machining can be quickly recognized.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A machine control gage system comprising:

a measuring device that determines a change in size of a workpiece during grinding, and outputs an electric signal corresponding to the determined change;

a controller that monitors the size of the workpiece according to the electric signal output from said measuring device, and outputs a signal for controlling a machine tool when the measurement of the workpiece reaches a predetermined size;

a data storage device that stores measurement data according to the electric signal output from said measuring device during grinding;

a data reproducing device that retrieves the measurement data stored in said data storage device according to operation of an external operation device, and reproduces the change in the size of the workpiece as machining proceeds; and a display device that displays a machining process reproduced by said data reproducing device.

2. The machine control gage system as defined in claim 1, wherein said display device is one of a meter and a bar-graph display.

3. The machine control gage system as defined in claim 1, further comprising:

an instructing device that instructs to fast-forward and slow-forward;

wherein a reproduction speed of the machining process shown on said display device is changeable according to an operation of said instructing device.

4. The machine control gage system as defined in claim 1, further comprising:

an abnormality detector that determines whether the machining process deviates from a predetermined machining process by monitoring the change in the size of the workpiece according to the electric signal output from said measuring device;

wherein said machine control gage system stores, in said data storage device, measurement data of at least part of a machining process of a specific workpiece which is determined as being defective by said abnormality detector, and reproduces the at least part of the machining process of the specific workpiece.

5. The machine control gage system as defined in claim 4, further comprising:

a minus threshold size being predetermined to be smaller than a target size indicating an end of grinding, said abnormality detector continuing monitoring the size of the workpiece for a predetermined period of time according to the electric signal output from said measuring device after the measurement of the workpiece reaches the target size and said controller outputs a first signal instructing said machine tool to complete grinding, said abnormality detector outputting a second single indicating an abnormal size when the measurement of the workpiece reaches the minus threshold size within the predetermined period of time; and an abnormality display device that shows that the size of the workpiece is abnormal according to the second signal output from said abnormality detector.

6. The machine control gage system as defined in claim 1, further comprising:

an interface to exterior capable of connecting to external equipment;

wherein said machine control gage system is able to reproduce, via said external equipment, the machining process reproduced by said data reproducing device.

7. The machine control gage system according to claim 6, wherein the external equipment is a personal computer.

8. A machine control gage system comprising:

a measuring device that determines a change in size of a workpiece during grinding, and outputs an electrical signal corresponding to the determined change;

a controller that monitors the size of the workpiece according to the electric signal output from said measuring device, and outputs a signal for controlling a machine tool when a measurement of the workpiece reaches a predetermined size, a minus threshold size being predetermined to be smaller than a target size indicating an end of grinding, said controller continuing monitoring the size of the workpiece for a predetermined period of time according to the electric signal output from said measuring device after the measurement of the workpiece reaches the target size and said controller outputs a first signal instructing said machine tool to complete grinding, said controller outputting a second signal indicating an abnormal size when the measurement of the workpiece reaches the minus threshold size within the predetermined period of time; and an abnormality display device that shows that the size of the workpiece is abnormal according to the second signal output from said controller.

9. The machine control gage system according to claim 8, wherein the measuring device determines the change in size of the workpiece by measuring one of an outer diameter of the workpiece and an inner diameter of the workpiece.

10. A machine control gage system comprising:

a measuring device that determines a change in size of a workpiece during grinding, and outputs an electric signal corresponding to the determined change;

a controller that monitors the size of the workpiece according to the electric signal output from said measuring device and outputs a signal for controlling a machine tool when a measurement of the workpiece reaches a predetermined size, a plus threshold size being predetermined to be larger than a target size indicating an end of grinding, said controller monitoring the size of the workpiece according to the electric signal output from said measuring device after said machine tool stops machining when the measurement of the workpiece does not reach the target size within a predetermined period of time, said controller outputting an abnormality detection signal indicating an abnormal size if the measurement of the workpiece is larger than the plus threshold size; and an abnormality display device that shows that the size of the workpiece is abnormal according to the abnormality detection signal output from said controller.

11. The machine control gage system as defined in claim 8, wherein the measuring device determines the change in size of the workpiece by measuring one of an outer diameter of the workpiece and an inner diameter of the workpiece.

* * * * *